United States Patent
Ueno (10) Patent No.: US 10,554,848 B2
(45) Date of Patent: Feb. 4, 2020

(54) IMAGE READING APPARATUS (71) Applicants: KABUSHIKI KAISHA TOSHIBA, Tokyo (JP); TOSHIBA TEC KABUSHIKI KAISHA, Tokyo (JP)

(72) Inventor: Sueo Ueno, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/925,057

(22) Filed: Mar. 19, 2018

(65) Prior Publication Data
US 2019/0289162 A1    Sep. 19, 2019

(51) Int. Cl.
G06F 15/00 (2006.01)
H04N 1/028 (2006.01)
G06F 3/12 (2006.01)
H04N 1/00 (2006.01)

(52) U.S. Cl.
CPC ......... H04N 1/0289 (2013.01); G06F 3/1201 (2013.01); H04N 1/0057 (2013.01); H04N 1/00774 (2013.01)

(58) Field of Classification Search
CPC ............... H04N 1/0289; H04N 1/0057; H04N 1/00774; G06F 3/1201
USPC ........................................................ 358/474
See application file for complete search history.

(56) References Cited

U.S. PATENT DOCUMENTS

| | | | | |
|---|---|---|---|---|
| 7,804,627 B2* | 9/2010 | Horiguchi | .......... | H04N 1/00681 358/474 |
| 9,007,627 B2* | 4/2015 | Kawasaki | .......... | G03G 15/0435 358/1.15 |
| 2007/0262233 A1* | 11/2007 | Shimokawa | .............. | G01J 1/32 250/205 |
| 2011/0228347 A1* | 9/2011 | Kohara | .................. | G03G 15/36 358/446 |
| 2016/0261758 A1* | 9/2016 | Kimura | ................ | H04N 1/0032 |
| 2017/0184849 A1* | 6/2017 | Hsu | .......................... | F21V 9/08 |

FOREIGN PATENT DOCUMENTS

| | | | |
|---|---|---|---|
| JP | H05119409 A | | 5/1993 |
| JP | H10142710 A | | 5/1998 |

* cited by examiner

Primary Examiner — Mark R Milia
(74) Attorney, Agent, or Firm — Kim & Stewart LLP (57) ABSTRACT

An image reading apparatus comprises a plate with light transparency on which a sheet is to be placed, the plate including light-responsive display elements, a scanner including a first light source and a light sensor and configured to read image information of a sheet placed on the plate according to light detected by the light sensor in response to light irradiated by the first light source, and a second light source that is controlled to irradiate light on a portion of the light-responsive display elements in the plate to produce a visible image on the plate.

13 Claims, 11 Drawing Sheets

IMAGE READING APPARATUS

FIELD

Embodiments described herein relate generally to an image reading apparatus.

BACKGROUND

An image reading apparatus reads image information on a sheet-like image receiving medium (hereinafter referred to as a "sheet") placed on a glass surface of a document table. The image reading apparatus has a mark at the periphery of the document table for enabling a user to recognize an arrangement position of the sheet on the glass surface of the document table. In one example, the marks are arrow marks indicating positions of corners of the sheet, a scale indicating a size of the sheet, a mark indicating a regular size of the sheet, and the like. However, the mark provided at the periphery of the document table is difficult for the user to understand, and there is a problem that it becomes difficult for the user to appropriately arrange the sheet.

DETAILED DESCRIPTION

In accordance with an embodiment, an image reading apparatus comprises a plate with light transparency on which a sheet is to be placed, the plate including light-responsive display elements, a scanner including a first light source and a light sensor and configured to read image information of a sheet placed on the plate according to light detected by the light sensor in response to light irradiated by the first light source, and a second light source that is controlled to irradiate light on a portion of the light-responsive display elements in the plate to produce a visible image on the plate.

Hereinafter, an image reading apparatus 1 of an embodiment is described with reference to the accompanying drawings. In each figure, the same components are denoted with the same reference numerals.

Figure 1:
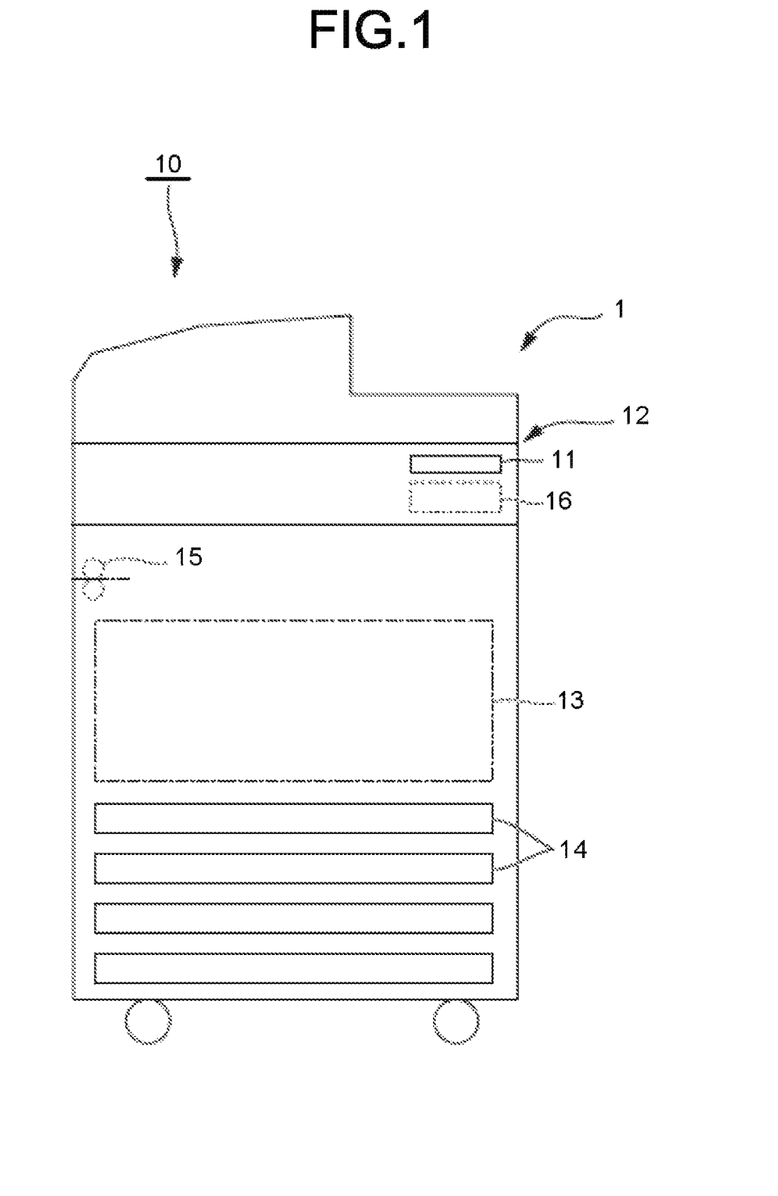
FIG. 1 is a diagram schematically illustrating an image forming apparatus provided with an image reading apparatus according to an embodiment.
Figure 2:
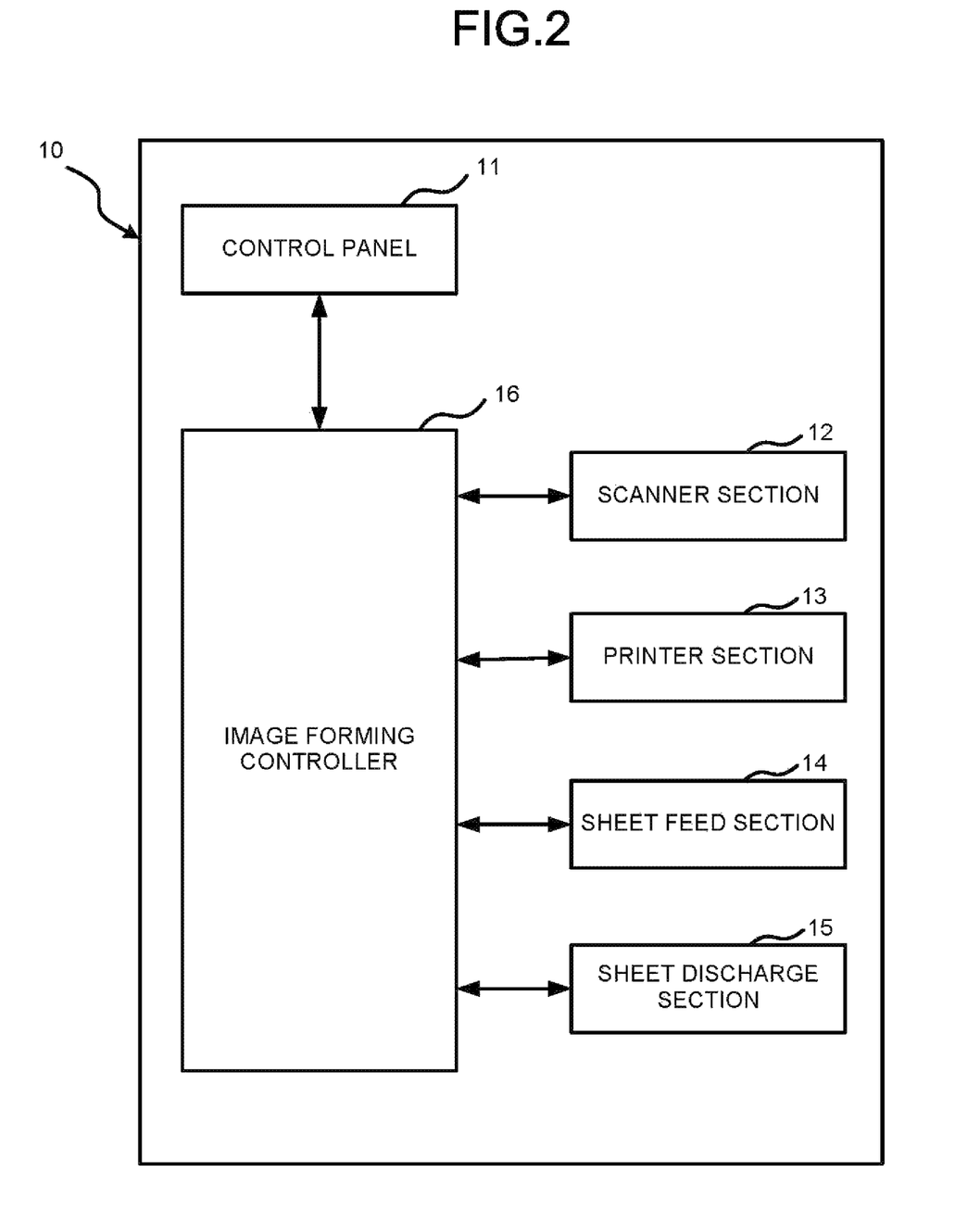
FIG. 2 is a block diagram of components of the image forming apparatus according to the embodiment.
Figure 3:
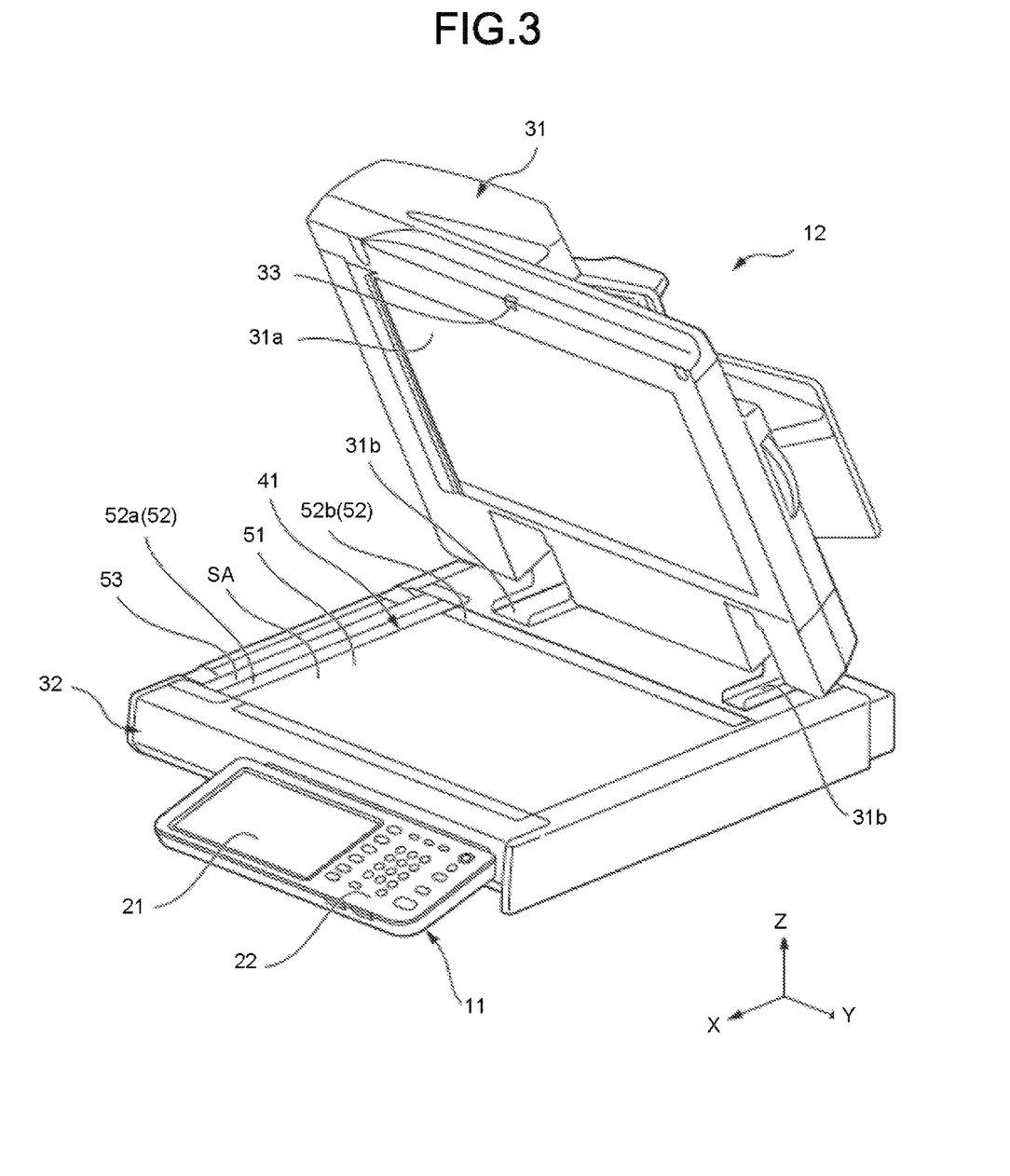
FIG. 3 is a perspective view of a control panel and a scanner section of the image forming apparatus according to the embodiment.

FIG. 1 is a diagram schematically illustrating an example of an image forming apparatus 10 provided with the image reading apparatus 1 according to the embodiment. FIG. 2 is a block diagram illustrating an example of hardware components of the image forming apparatus 10 according to the embodiment. FIG. 3 is a perspective view of a control panel 11 and a scanner section 12 of the image forming apparatus 10 according to the embodiment.

As shown in FIG. 1 and FIG. 2, the image forming apparatus 10 includes the control panel 11, the scanner section 12, a printer section 13, a sheet feed section 14, a sheet discharge section 15, and an image forming controller 16. The image forming apparatus 10 includes the image reading apparatus 1 that includes the scanner section 12 and the image forming controller 16.

The image forming apparatus 10 forms an image on a printing object. The printing object is a sheet-like medium such as paper (hereinafter, referred to as a "sheet"). The image reading apparatus 1 reads image information on a copy object. The copy object is, e.g., an original document.

As shown in FIG. 3, the control panel 11 includes a display section 21, an operation section 22, and a panel controller. The display section 21 displays various information on the image forming apparatus 10. For example, the display section 21 is a display device such as a liquid crystal display and an organic EL (Electro Luminescence) display. The operation section 22 receives an operation by a user. For example, the operation section 22 includes various keys and a touch panel. The panel controller controls the display on the display section 21 and reception of the operation by the user through the operation section 22. The panel controller includes a control circuit having a CPU (Central Processing Unit), a ROM (Read Only Memory), and a RAM (Random Access Memory). The panel controller outputs a signal corresponding to the operation by the user on the operation section 22 to the image forming controller 16. For example, the control panel 11 receives an input relating to a sheet S which is a printing object and a sheet Q which is a copy object. The control panel 11 receives an input relating to a size of the sheet (sheet size) and a type of the sheet. The sheet size includes a regular size and an irregular size. The types of sheets include sheet quality, weight, thickness, and the like.

The scanner section 12 includes an automatic document feeding device 31, a reading section 32, an irradiation section 33, and a scanner controller. The automatic document feeding device 31 automatically conveys the sheet Q which is the copy object to the reading section 32. The reading section 32 reads the image information of the sheet Q as intensity of light. The reading section 32 reads the sheet Q automatically conveyed by the automatic document feeding device 31 and the sheet Q placed on a document table glass 51 by the user. The reading section 32 generates image data based on the read image information. The irradiation section 33 irradiates the document table glass 51 of the reading section 32 with light of a predetermined wavelength to perform scanning. The scanner controller controls the operations of the automatic document feeding device 31, the reading section 32, and the irradiation section 33. The scanner controller includes a control circuit having a CPU, a ROM, and a RAM. The scanner section 12 sends the image data generated by the reading section 32 to the printer section 13.

The printer section 13 forms an image on a surface of the sheet S based on image data received from the scanner section 12 or an external device. The sheet S is a printing object on which the image data is printed. For example, the printer section 13 forms an image (hereinafter, referred to as a toner image) with a developer such as a toner. The printer section 13 transfers the toner image onto the surface of the sheet S. The printer section 13 applies heat and pressure to the toner image on the surface of the sheet S to fix the toner image on the sheet S. The printer section 13 sends the sheet S to which the toner image is fixed to the sheet discharge section 15. The printer section 13 includes a printer controller. The printer controller includes a control circuit having a CPU, a ROM, and a RAM. The printer controller controls the printing of an image on the sheet S by the printer section 13.

The sheet feed section 14 supplies sheets S one by one to the printer section 13 in accordance with a timing at which the printer section 13 forms a toner image. For example, the sheet feed section 14 includes a plurality of sheet feed cassettes. Each of the sheet feed cassettes accommodates sheets S of preset size and type. Each of the sheet feed cassettes has a pickup roller. Each pickup roller picks up sheets S one by one from each sheet feed cassette. Each pickup roller sends the sheet S taken out of each sheet feed cassette to the printer section 13.

The sheet discharge section 15 discharges the sheet S received from the printer section 13 to the outside of the image forming apparatus 10.

The image forming controller 16 controls the overall operation of the image forming apparatus 10. The image forming controller 16 controls the control panel 11, the scanner section 12, the printer section 13, the sheet feed section 14, and the sheet discharge section 15. The image forming controller 16 includes a control circuit having a CPU, a ROM, and a RAM. The ROM stores a control program for comprehensively controlling the overall operation of the image forming apparatus 10. The RAM temporarily stores various data used for processing by the CPU.

Figure 4:
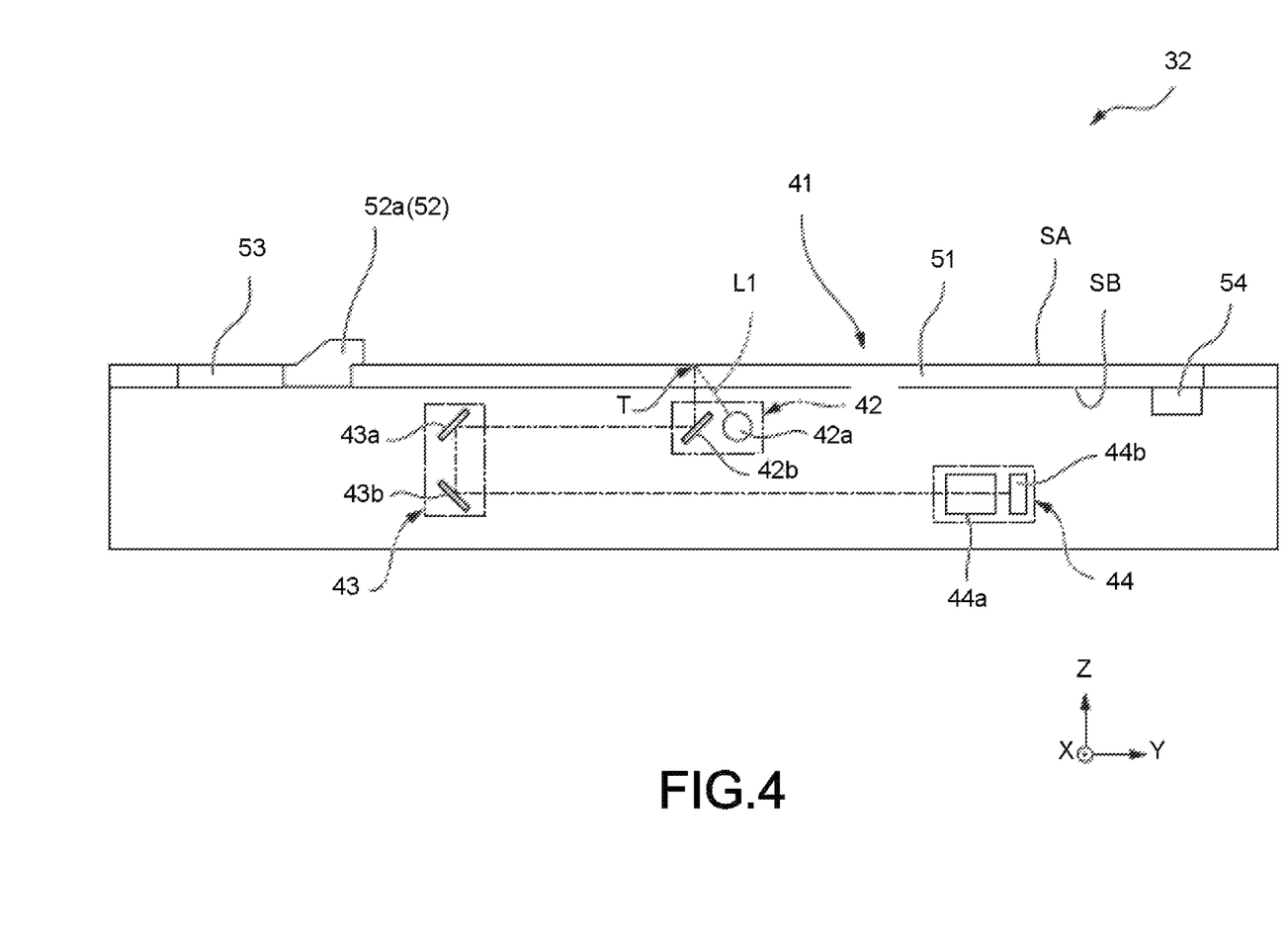
FIG. 4 is a cross-sectional view schematically illustrating components of the scanner section of the image reading apparatus according to the embodiment.
Figure 5:
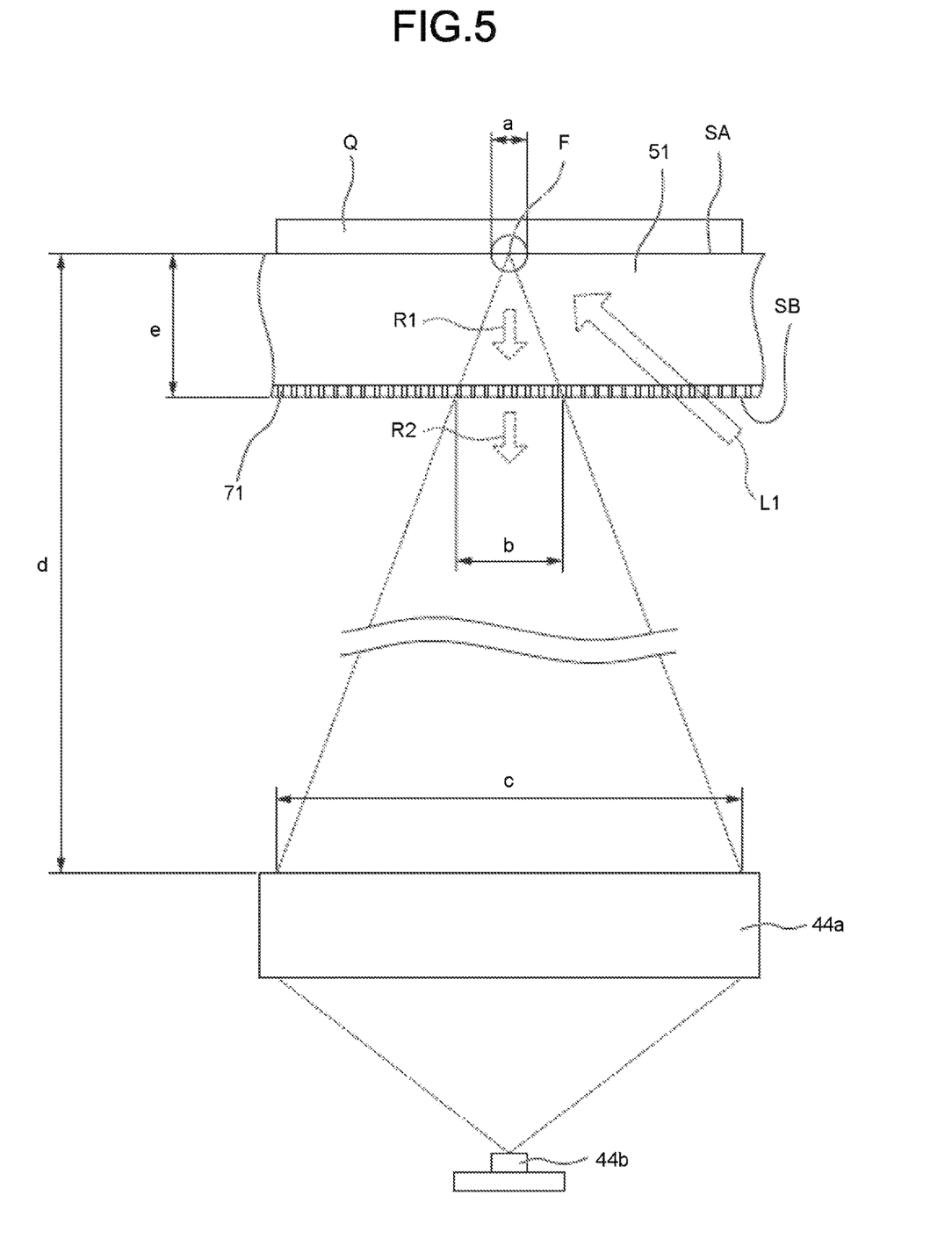
FIG. 5 is a cross-sectional view for schematically illustrating one pixel spot area on a document table glass in the scanner section of the image reading apparatus according to the embodiment.
Figure 6:
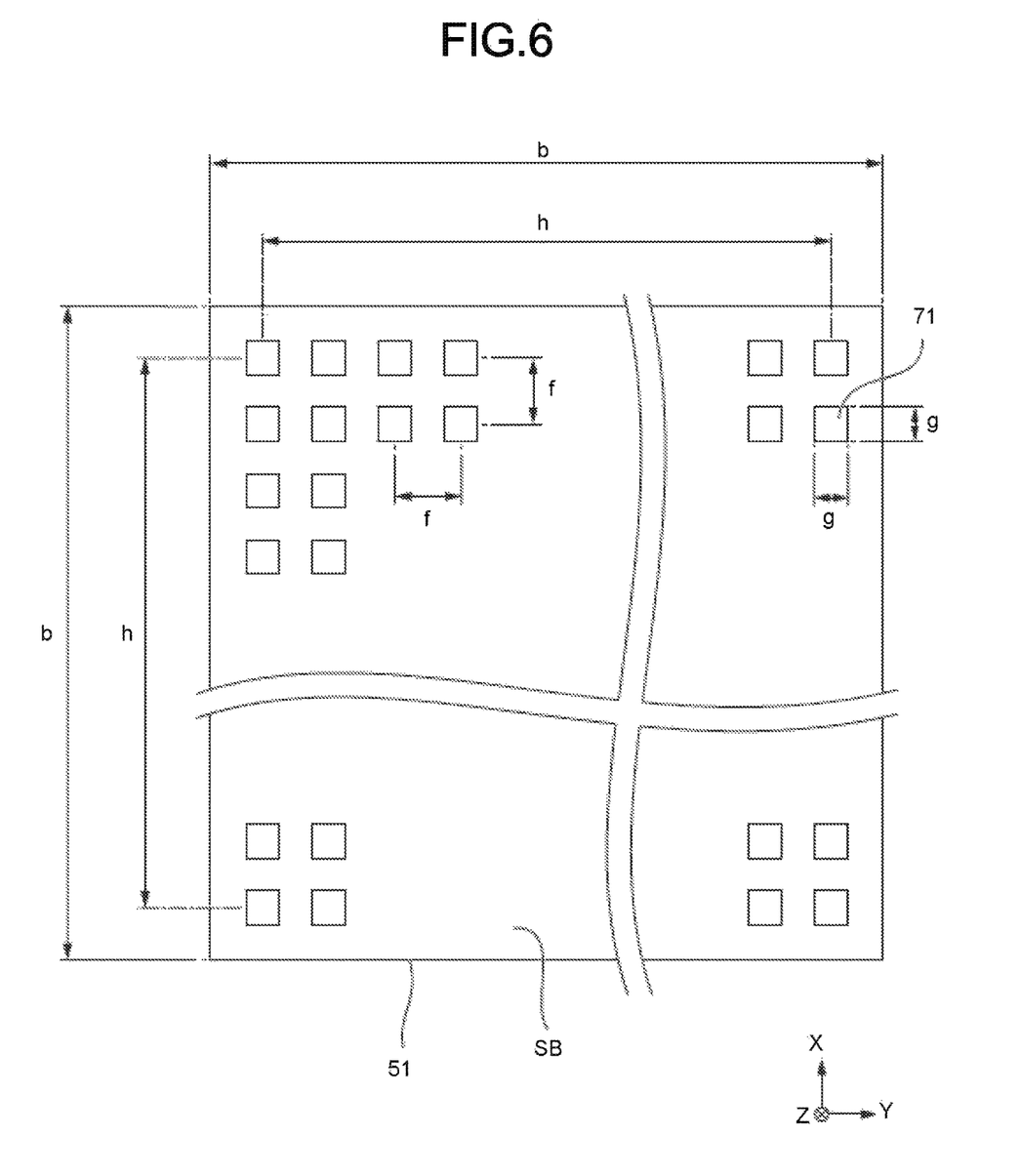
FIG. 6 is a plan view for schematically illustrating one pixel spot area on the document table glass in the scanner section of the image reading apparatus according to the embodiment.
Figure 7:
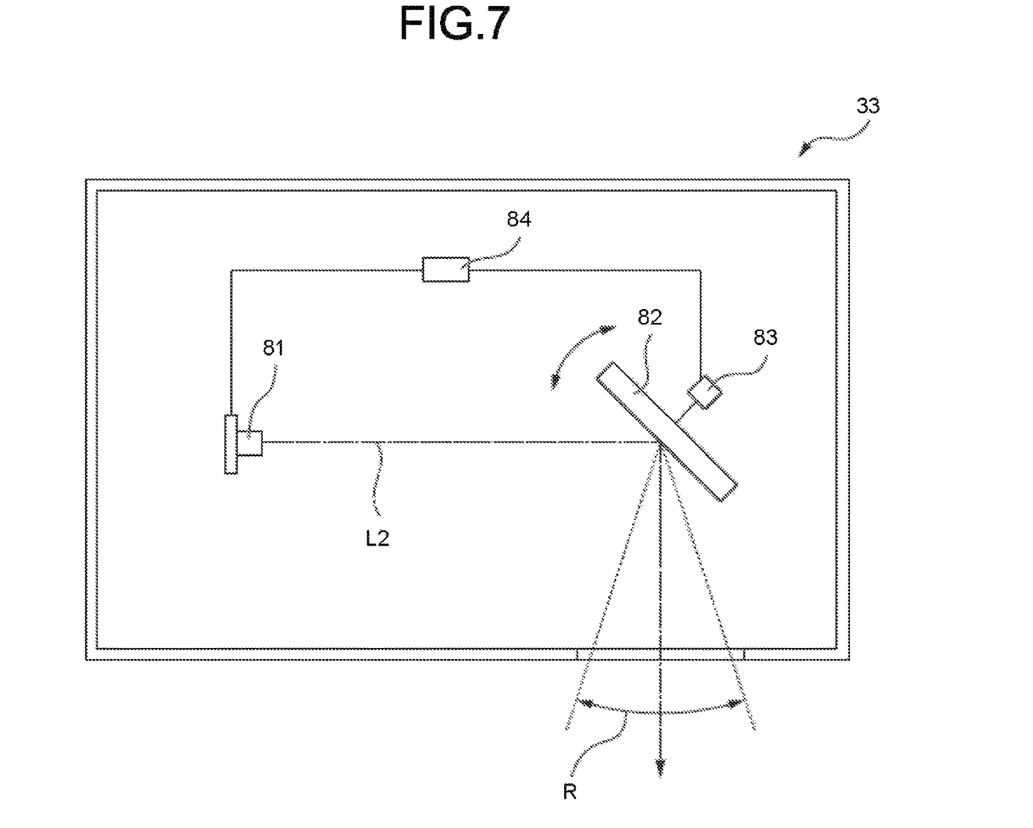
FIG. 7 is a cross-sectional view schematically illustrating components of an irradiation section of the image reading apparatus according to the embodiment.
Figure 8:
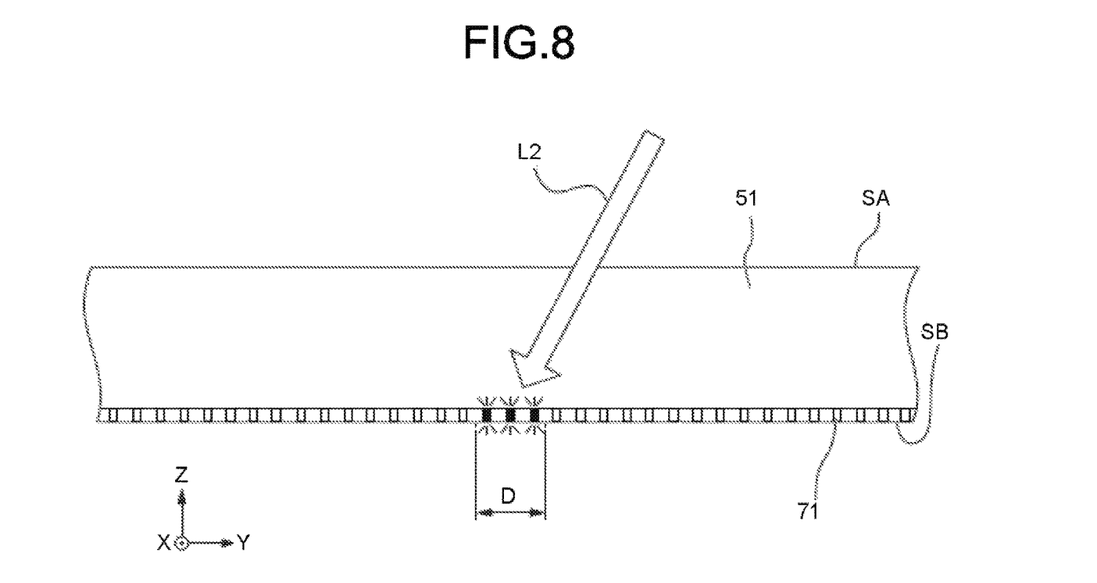
FIG. 8 is a cross-sectional view for schematically illustrating an example of a laser light emitted from the irradiation section and a state of a resonant particle of the document table glass of the image reading apparatus according to the embodiment.
Figure 9:
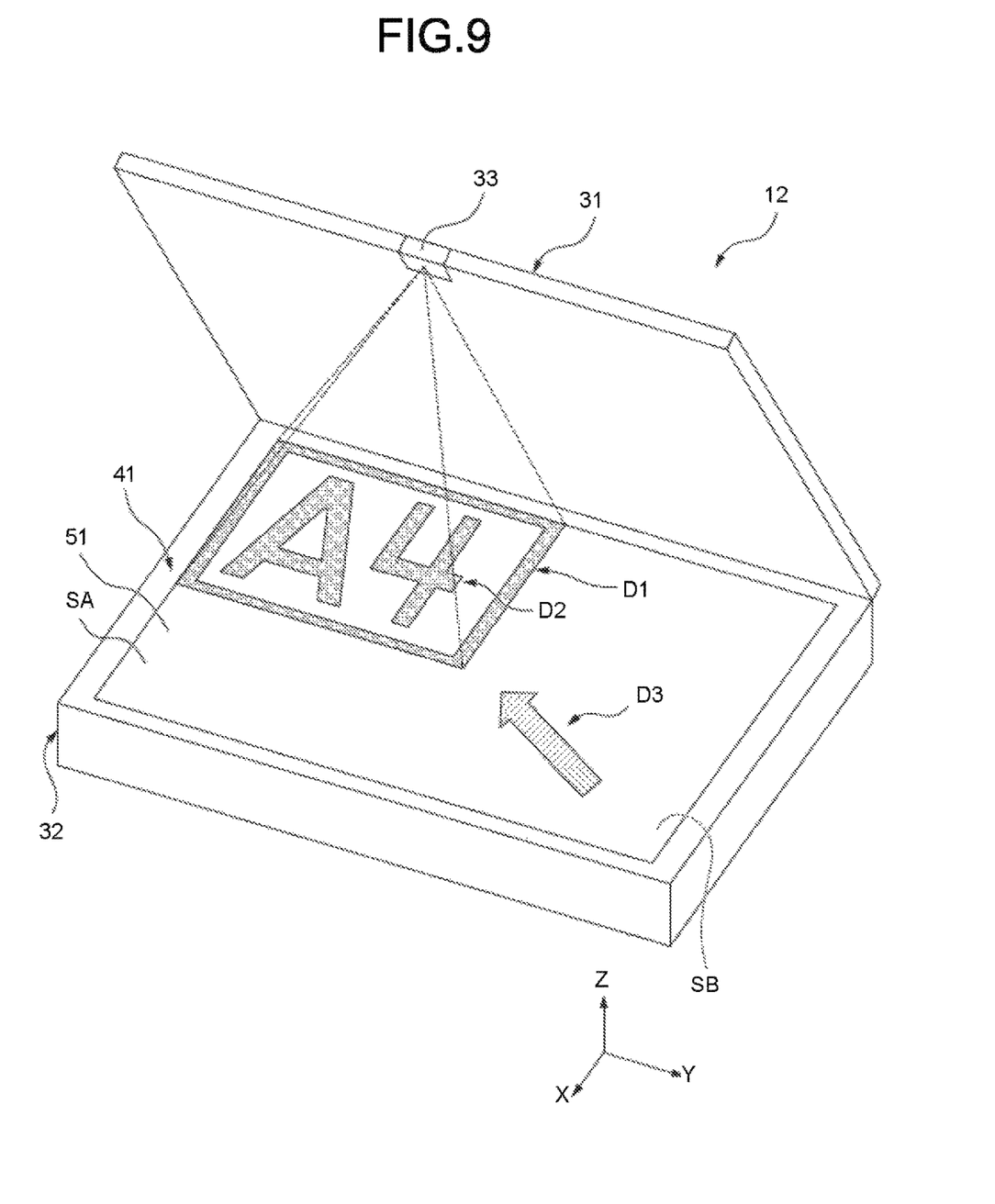
FIG. 9 is a perspective view schematically illustrating a display formed on the document table glass by the laser light emitted from the irradiation section of the image reading apparatus according to the embodiment.
Figure 10:
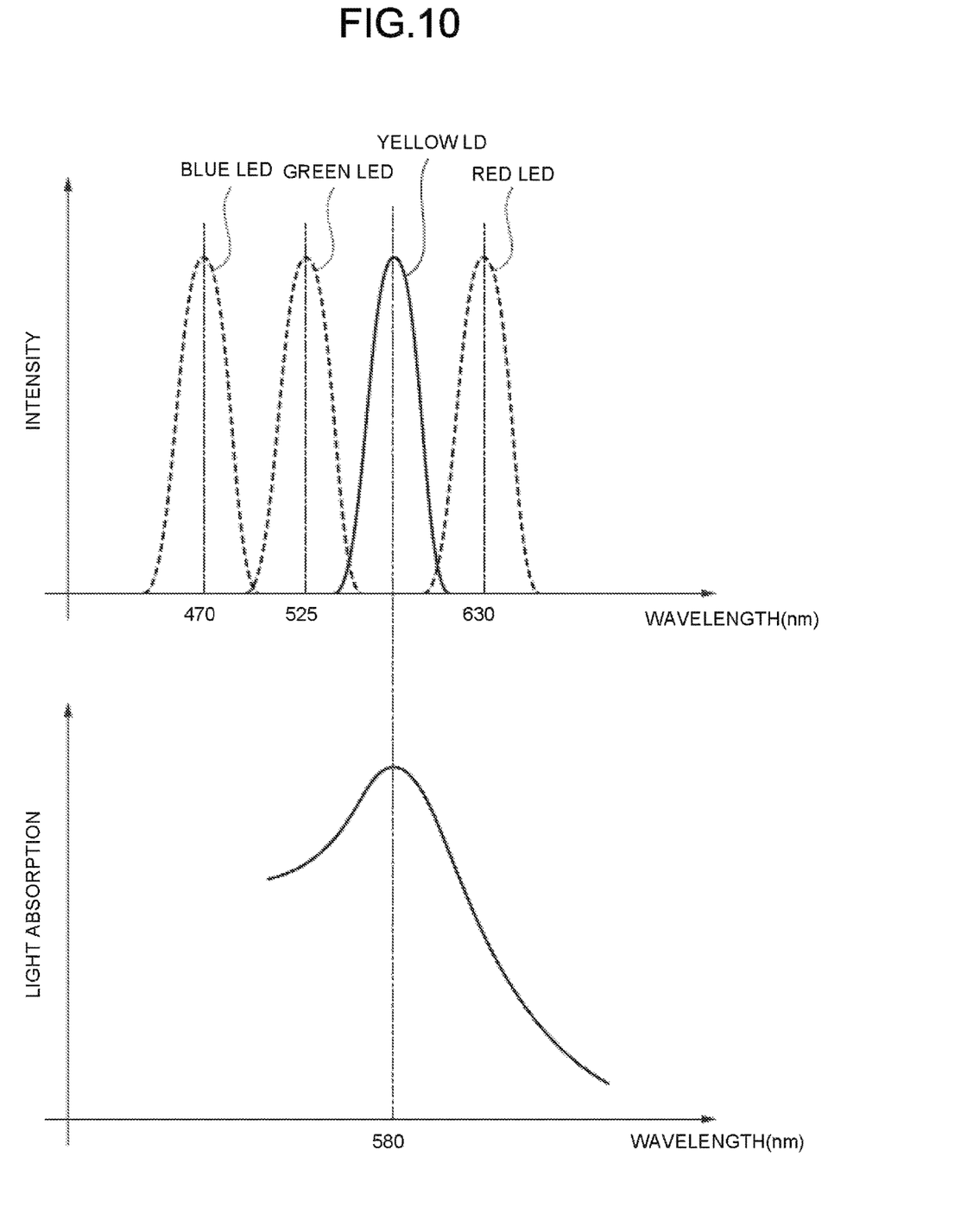
FIG. 10 is a diagram schematically illustrating an example of a spectral distribution of a light source section of the reading section, a spectral distribution of the irradiation section and a wavelength distribution of the absorbance of the resonant particle in the image reading apparatus according to the embodiment.

The details of the scanner section 12 are described below. FIG. 4 is a cross-sectional view schematically illustrating components of the scanner section 12 of the image reading apparatus 1 according to the embodiment. FIG. 5 is a cross-sectional view for schematically illustrating one pixel spot area on the document table glass 51 in the scanner section 12 of the image reading apparatus 1 according to the embodiment. FIG. 6 is a plan view for schematically illustrating one pixel spot area on the document table glass 51 in the scanner section 12 of the image reading apparatus 1 according to the embodiment. FIG. 7 is a cross-sectional view schematically illustrating components of the irradiation section 33 of the image reading apparatus 1 according to the embodiment. FIG. 8 is a cross-sectional view for schematically illustrating an example of laser light L2 emitted from the irradiation section 33 and a state of a resonant particle 71 of the document table glass 51 of the image reading apparatus 1 according to the embodiment. FIG. 9 is a perspective view schematically illustrating a display formed on the document table glass 51 by the laser light L2 emitted from the irradiation section 33 of the image reading apparatus 1 according to the embodiment. FIG. 10 is a diagram illustrating an example of a spectral distribution of a light source section 42a of the reading section 32, a spectral distribution of the irradiation section 33 and a wavelength distribution of the absorbance of the resonant particle 71 in the image reading apparatus 1 according to the embodiment.

As shown in FIG. 3, the automatic document feeding device 31 includes a platen 31a. The platen 31a presses the sheet Q placed on the document table glass 51 by the user against the document table glass 51. The automatic document feeding device 31 includes an opening and closing mechanism 31b. The opening and closing mechanism 31b opens and closes the automatic document feeding device 31 with respect to the document table glass 51. For example, the opening and closing mechanism 31b is a hinge. The automatic document feeding device 31 exposes the surface of the document table glass 51 in an open state to the outside. The platen 31a of the automatic document feeding device 31, when in the closed state, covers the entire surface of the document table glass 51.

The reading section 32 reads the image information of the sheet Q by a scanning type reduction optical system. As shown in FIG. 4, the reading section 32 includes a document table 41, a first carriage 42, a second carriage 43, and an image capturing section 44.

The document table 41 includes the document table glass 51, a ruler 52, and a through read glass 53. The document table glass 51 is a plate-like member having light transparency. The document table glass 51 includes a sheet placing surface SA on which the sheet Q is placed by the user. The sheet placing surface SA is a surface exposed to the outside between the front and back surfaces facing each other in a thickness direction of the document table glass 51. The light emitted to the sheet Q on the sheet placing surface SA and reflected light from the sheet Q pass through the document table glass 51. As shown in FIG. 5, the document table glass 51 has a plurality of the resonant particles 71 resonating with light of a predetermined wavelength on a surface opposite to the sheet placing surface SA in the thickness direction of the document table glass 51. The surface opposite to the sheet placing surface SA in the document table glass 51 is a back surface SB of the document table glass 51. For example, the light of a predetermined wavelength is light in the yellow wavelength area. The yellow wavelength area is 550 to 610 nm. For example, the resonant particle 71 is a metal nanoparticle that causes a resonance reaction of plasmon resonance. A plurality of the resonant particles 71 is dispersedly arranged on the back surface SB of the document table glass 51.

As shown in FIG. 3, the ruler 52 is fixed to the document table glass 51. The shape of the ruler 52 is formed to protrude one step from the sheet placing surface SA. The ruler 52 supports an end of the sheet Q on the sheet placing surface SA. The ruler 52 is provided with a mark indicating a position as a reference for arranging the sheet Q on the sheet placing surface SA for the user. For example, the mark is an arrow mark indicating positions of the corners of the sheet Q, a scale indicating a size of the sheet Q, a mark indicating the regular size of the sheet Q, and the like. The ruler 52 includes a first ruler 52a and a second ruler 52b. The first ruler 52a is arranged parallel to a main scanning direction X. The second ruler 52b is arranged parallel to a sub-scanning direction Y. The main scanning direction X and the sub-scanning direction Y are orthogonal in a plane parallel to the sheet placing surface SA. A height direction Z is orthogonal to the main scanning direction X and the sub-scanning direction Y. The height direction Z is parallel to the thickness direction of the document table glass 51. The through read glass 53 is the plate-like member having the light transparency. The light emitted to the sheet Q conveyed by the automatic document feeding device 31 and reflected light from the sheet Q pass through the through read glass 53.

As shown in FIG. 4, the document table 41 includes a platen sensor 54. The platen sensor 54 detects an opening and closing state of the platen 31a of the automatic document feeding device 31. For example, the platen sensor 54 is an angle sensor that detects whether or not an inclination angle of the platen 31a with respect to the sheet placing surface SA is less than or equal to a predetermined angle. The platen sensor 54 outputs a signal indicating that the platen 31a is in a closed state if the inclination angle of the platen 31a with respect to the sheet placing surface SA is equal to or less than the predetermined angle. The platen sensor 54 outputs a signal indicating that the platen 31a is in the open state if the inclination angle of the platen 31a with respect to the sheet placing surface SA is larger than the predetermined angle.

The first carriage 42 includes a light source section 42a and a first mirror 42b. The first carriage 42 moves the light source section 42a and the first mirror 42b together in the sub-scanning direction Y. The light source section 42a emits the light. Light L1 emitted from the light source section 42a passes through the document table glass 51 or the through read glass 53 to be irradiated on the sheet Q. For example, the light source section 42a includes a red LED (Light Emitting Diode), a green LED, a blue LED, and a light guide. The red LED emits light in a red wavelength area. For example, the red wavelength area is 600 to 660 nm. The green LED emits light in a green wavelength area. For example, the green wavelength area is 495 to 555 nm. The blue LED emits light in a blue wavelength area. For example, the blue wavelength area is 440 to 500 nm. The shape of the light guide is formed into a columnar shape. A longitudinal direction of the light guide is parallel to the main scanning direction X. The light guide irradiates the sheet Q with the light L1 emitted from the light source section 42a. The light L1 from the light source section 42a is a mixture of the light emitted from each of the red LED, the green LED, and the blue LED.

The first carriage 42 irradiates the sheet Q placed on the document table glass 51 by the user with the light L1 from the light source section 42a through the document table glass 51. The first carriage 42 irradiates the sheet Q on the document table glass 51 with the light L1 from the light source section 42a while moving in the sub-scanning direction Y. The first carriage 42 moves in the sub-scanning direction Y to optically scan the entire surface of the sheet Q. The first carriage 42 irradiates the sheet Q conveyed by the automatic document feeding device 31 with the light L1 from the light source section 42a through the through read glass 53. The first carriage 42 irradiates the sheet Q conveyed by the automatic document feeding device 31 with the light L1 from the light source section 42a in a state in which the movement thereof is stopped.

The first mirror 42b reflects reflected light by the sheet Q of the light L1 irradiated on the sheet Q from the light source section 42a towards a second mirror 43a of the second carriage 43. The reflected light by the sheet Q passes through the document table glass 51 or the through read glass 53 and is incident on the first mirror 42b.

The second carriage 43 includes the second mirror 43a and a third mirror 43b. The second carriage 43 moves the second mirror 43a and the third mirror 43b together in the sub-scanning direction Y. The second carriage 43 moves in conjunction with the movement of the first carriage 42. A moving speed of the second carriage 43 is the half of the moving speed of the first carriage 42. The second mirror 43a reflects the light from the first mirror 42b towards the third mirror 43b. The third mirror 43b reflects the light from the second mirror 43a towards a condenser lens 44a of an image capturing section 44.

The image capturing section 44 includes the condenser lens 44a and a CCD (Charge Coupled Device) sensor 44b. The condenser lens 44a collects the light from the third mirror 43b. The condenser lens 44a forms an image of the condensed light on an imaging surface of the CCD sensor 44b. The CCD sensor 44b is a line sensor. The CCD sensor 44b converts the light imaged by the condenser lens 44a to electric charge. The CCD sensor 44b converts the intensity of the light of the image formed by the condenser lens 44a to an electric signal. The CCD sensor 44b generates image data based on an electric signal generated by photoelectric conversion.

A reading position T of the reading section 32 for the sheet Q placed on the document table glass 51 by the user moves in the sub-scanning direction Y as the first carriage 42 moves. The reading position T is a position for one line extending parallel to the main scanning direction X. As the reading position T moves in the sub-scanning direction Y, images of the sheet Q at the reading position T are sequentially formed on the imaging surface of the CCD sensor 44b. The reading position T of the reading section 32 for the sheet Q conveyed by the automatic document feeding device 31 is a fixed position on the through read glass 53. By conveying the sheet Q to the reading position T by the automatic document feeding device 31, images of the sheet Q at the reading position T are sequentially formed on the imaging surface of the CCD sensor 44b. The CCD sensor 44b stores a signal corresponding to the formed image at the reading position T as a signal of pixels of one line in the main scanning direction X. The CCD sensor 44b generates the image data of the entire sheet Q based on signals of a plurality of lines. The CCD sensor 44b outputs the generated image data to the scanner controller.

As shown in FIG. 5, in the reduction optical system of the reading section 32, a spot area of one pixel on the back surface SB of the document table glass 51 expands with respect to a focus of one pixel at a focal position F. For example, if a size a of one pixel at the focal position F is 42 μm, a spot size b of the spot area of one pixel on the back surface SB of the document table glass 51 is about 300 μm. The size of one pixel is the length of one side in a square pixel. The spot size b is the length of one side in the square spot area. An effective diameter c of the condenser lens 44a is 30 mm, a focal length d of the condenser lens 44a is 500 mm, and a thickness e of the document table glass 51 is 4 mm.

The reflected light R1 by the sheet Q of the light L1 irradiated on the sheet Q of the document table glass 51 from the light source section 42a is attenuated at the time of passing through the document table glass 51. The reflected light R1 is attenuated by the resonant particle 71 on the back surface SB of the document table glass 51 to become reflected light R2. The plurality of resonant particles 71 dispersedly arranged on the back surface SB of the document table glass 51 sets an amount of attenuation of the reflected light R2 with respect to the reflected light R1 equal to or smaller than a predetermined value. For example, the plurality of the resonant particles 71 sets the amount of attenuation of the reflected light R2 with respect to the reflected light R1 to about 1%. As shown in FIG. 6, the plurality of resonant particles 71 is arranged at lattice points of a square lattice on the back surface SB of the document table glass 51. A pitch f of the lattice point of the square lattice is ten times the size of the resonant particle 71. If the shape of the resonant particle 71 is a square and a length g of one side of the square (the size of the resonant particle 71) is 0.062 μm, the pitch f of the lattice point of the square lattice is 0.62 μm. On the back surface SB of the document table glass 51, an arbitrary square area whose length of one side is the same as the pitch f has one resonant particle 71. For an area of an arbitrary square area, the area of the resonant particle 71 for one is 1%. If the spot size b of the spot area of one pixel on the back surface SB of the document table glass 51 is 300 μm, the number of the resonant particles 71 in the spot area is 484*484. A maximum distance h between two resonant particles 71 in the direction parallel to each side of the square spot area is 483*0.62 μm.

The irradiation section 33 and the plurality of resonant particles 71 of the document table glass 51 make up a display section which performs display on the document table glass 51. As shown in FIG. 3, the irradiation section 33 is arranged in the automatic document feeding device 31. In the open state of the automatic document feeding device 31, the irradiation section 33 is arranged at a position away from the document table glass 51 at the sheet placing surface SA side in the thickness direction of the document table glass 51. As shown in FIG. 7, the irradiation section 33 includes a light source 81, a MEMS (Micro Electro Mechanical Systems) mirror 82, a mirror driving section 83, and an irradiation controller 84. The light source 81 includes a light emitting element that emits laser light L2 of a predetermined wavelength. For example, the laser light L2 of the predetermined wavelength is a laser light in a yellow wavelength area. The light emitting element is a yellow laser diode (LD: Laser Diode). The light source 81 emits the laser light L2 of the predetermined wavelength towards the MEMS mirror 82. The MEMS mirror 82 reflects the laser light L2 from the light source 81 towards the document table glass 51. The MEMS mirror 82 two-dimensionally scans the document table glass 51 by the laser light L2 from the light source 81. For example, the MEMS mirror 82 includes two rotation axes. The MEMS mirror 82 rotates reciprocally about each of the two rotation axes. A two-dimensional scanning range R of the MEMS mirror 82 corresponds to the entire area of the document table glass 51. For example, the scanning range R of the MEMS mirror 82 corresponds to the entire surface of the back surface SB on which a plurality of the resonant particles 71 is arranged in the document table glass 51. The mirror driving section two-dimensionally drives the MEMS mirror 82. The irradiation controller 84 controls the operations of the light source 81 and the mirror driving section 83. The irradiation controller 84 includes a control circuit having a CPU, a ROM, and a RAM.

The irradiation controller 84 controls the operations of the light source 81 and the mirror driving section 83 based on the opening and closing state of the platen 31a detected by the platen sensor 54. For example, the irradiation controller 84 two-dimensionally scans the document table glass 51 with the laser light L2 from the light source 81 if the platen 31a is switched from the closed state to the open state. The irradiation controller 84 irradiates the laser light L2 from a position away from the document table glass 51 toward the document table glass 51 at the sheet placing surface SA side in the thickness direction of the document table glass 51.

The irradiation controller 84 controls the operations of the light source 81 and the mirror driving section 83 based on the information on the size of the sheet Q or information on a predetermined sheet size. The irradiation controller 84 acquires information on the size of the sheet Q from the control panel 11. The information on the size of the sheet Q is input by the user to the control panel 11. The irradiation controller 84 stores the information acquired from the control panel 11 in the RAM. The irradiation controller 84 stores information on a plurality of different predetermined sheet sizes in the ROM. For example, the information on the predetermined sheet size is information on a standardized sheet size in a fixed form. In a case of holding the information on the size of the sheet Q, the irradiation controller 84 controls the operations of the light source 81 and the mirror driving section 83 based on information on the size of the sheet Q. In a case of not holding the information on the size of the sheet Q, the irradiation controller 84 controls the operations of the light source 81 and the mirror driving section 83 based on information on a plurality of different predetermined sheet sizes.

The irradiation controller 84 sets a scanning area D in the document table glass 51 based on the information on the size of the sheet Q or the information on the predetermined sheet size. The irradiation controller 84 scans the scanning area D of the document table glass 51 with the laser light L2. If the irradiation controller 84 holds the information on the size of the sheet Q, the irradiation controller 84 scans the scanning area D corresponding to the information on the size of the sheet Q. If the irradiation controller 84 does not hold the information on the size of the sheet Q, the irradiation controller 84 sequentially switches a plurality of the scanning areas D corresponding to the information on a plurality of different predetermined sheet sizes to scan the scanning area D. As shown in FIG. 8, the irradiation controller 84 irradiates the resonant particle 71 existing in the scanning area D of the back surface SB of the document table glass 51 with the laser light L2 from the sheet placing surface SA side. The irradiation controller 84 enables the resonant particle 71 to develop a color by plasmon-resonating the resonant particle 71 with the laser light L2. The irradiation controller 84 enables the user at the side of the sheet placing surface SA to visually recognize the developed color of the resonant particle 71 on the back surface SB of the document table glass 51 through the document table glass 51. The scanning area D of the document table glass 51 includes an area D1 of a frame figure, an area D2 of characters, an area D3 of an arrow, and the like as shown in 9. The area D1 of the frame figure shows the arrangement area of the sheet Q by the frame figure having a size and shape corresponding to the sheet size. The area D2 of the characters indicates the sheet size by characters inside the area D1 of the frame figure. The area D3 of the arrow indicates the arrangement position of the sheet Q outside the area D1 of the frame figure.

The irradiation controller 84 controls the operations of the light source 81 and the mirror driving section 83 according to the position of the irradiation section 33 varying depending on the inclination angle of the platen 31a with respect to the sheet placing surface SA. The irradiation controller 84 controls a correction operation for displaying the proper shape on the document table glass 51 regardless of the position change of the irradiation section 33. For example, the irradiation controller 84 controls the correction operation based on the inclination angle detected by the platen sensor 54. The irradiation controller 84 controls the operations of the light source 81 and the mirror driving section 83 so that distortion in the scanning area D does not occur due to the position change of the irradiation section 33.

As shown in FIG. 10, a wavelength spectrum distribution of the light L1 from the light source section 42a is maximal at the red, green, and blue wavelength areas according to the red LED, the green LED, and the blue LED. In the wavelength spectrum distribution of the light L1 from the light source section 42a, an intensity distribution of the yellow wavelength area is almost zero. The wavelength spectrum distribution of the laser light L2 from the light source 81 becomes maximal at the yellow wavelength area according to the yellow LD. The absorbance of the resonant particle 71 of the document table glass 51 is maximal at the yellow wavelength area. The maximum wavelength area in the wavelength spectrum distribution of the laser light L2 from the light source 81 is shifted from the maximum wavelength area in the wavelength spectrum distribution of the light L1 from the light source section 42a. The maximum wavelength area in the wavelength spectrum distribution of the laser light L2 from the light source 81 corresponds to the wavelength area where the intensity distribution is substantially zero in the wavelength spectrum distribution of the light L1 from the light source section 42a. The resonant particle 71 of the document table glass 51 causes a resonance reaction with respect to the laser light L2 from the light source 81. The resonant particle 71 of the document table glass 51 is non-responsive to or suppresses the resonance reaction with the light L1 from the light source section 42a.

Since the image reading apparatus 1 according to the embodiment described above has the display section performing the display on the document table glass 51, the image reading apparatus 1 can accurately present the information on the sheet Q to the user. Since the display section performs the display on the document table glass 51 by resonance by the laser light L2 having the predetermined wavelength, the display can be controlled by the wavelength of the light emitted to the document table glass 51.

Since the irradiation section 33 for emitting the laser light L2 from the sheet placing surface SA side of the document table glass 51 is provided, it is possible to prevent the user from being irradiated with the laser light L2. Since the resonant particle 71 is arranged on the back surface SB of the document table glass 51, the optical obstruction of the resonant particle 71 with respect to the focal position F of the reading section 32 can be suppressed. Since the display section which carries out display by the laser light L2 of the predetermined wavelength is provided, it is possible to reduce a noise in the reading of the sheet Q by the reading section 32. Since the predetermined wavelength is shifted from the maximum wavelength area in the wavelength spectrum distribution of the light L1 from the light source section 42a, the resonance of the resonant particle 71 by the light L1 from the light source section 42a can be suppressed. Since the display section which performs the display by the laser light L2 in the yellow wavelength area for the light L1 in the wavelength areas of red, green and blue is provided, it is possible to reduce the overlap in the wavelength between the light L1 and the laser light L2. Since the overlap in the wavelength between the light L1 from the light source section 42a and the laser light L2 is reduced, it is possible to reduce the noise in the reading of the sheet Q by the reading section 32.

Since the display section displaying the area where the sheet Q is placed on the document table glass 51 is provided, the arrangement position of the sheet Q on the document table glass 51 can be accurately presented to the user. Since the display section which displays the area D1 of the frame figure having the size corresponding to the size of the sheet Q on the document table glass 51 is provided, the user can easily grasp the arrangement position of the sheet Q. Since the display section which sequentially switches the areas D1 of the frame figure having the sizes corresponding to the plurality of predetermined sheet sizes to display that it is provided, it is possible to support the proper placement of the sheet Q by the user. Since the display section which carries out display at the time of opening the platen 31a is provided, the information on the sheet Q can be presented to the user at an appropriate timing.

Modifications according to the embodiment are described below.

In the image reading apparatus 1 of the above-mentioned embodiment, the irradiation section 33 is arranged in the automatic document feeding device 31, but it is not limited thereto. In a modification according to the embodiment, the irradiation section 33 may be arranged away from the document table glass 51 at the back surface SB side in the thickness direction of the document table glass 51.

Figure 11:
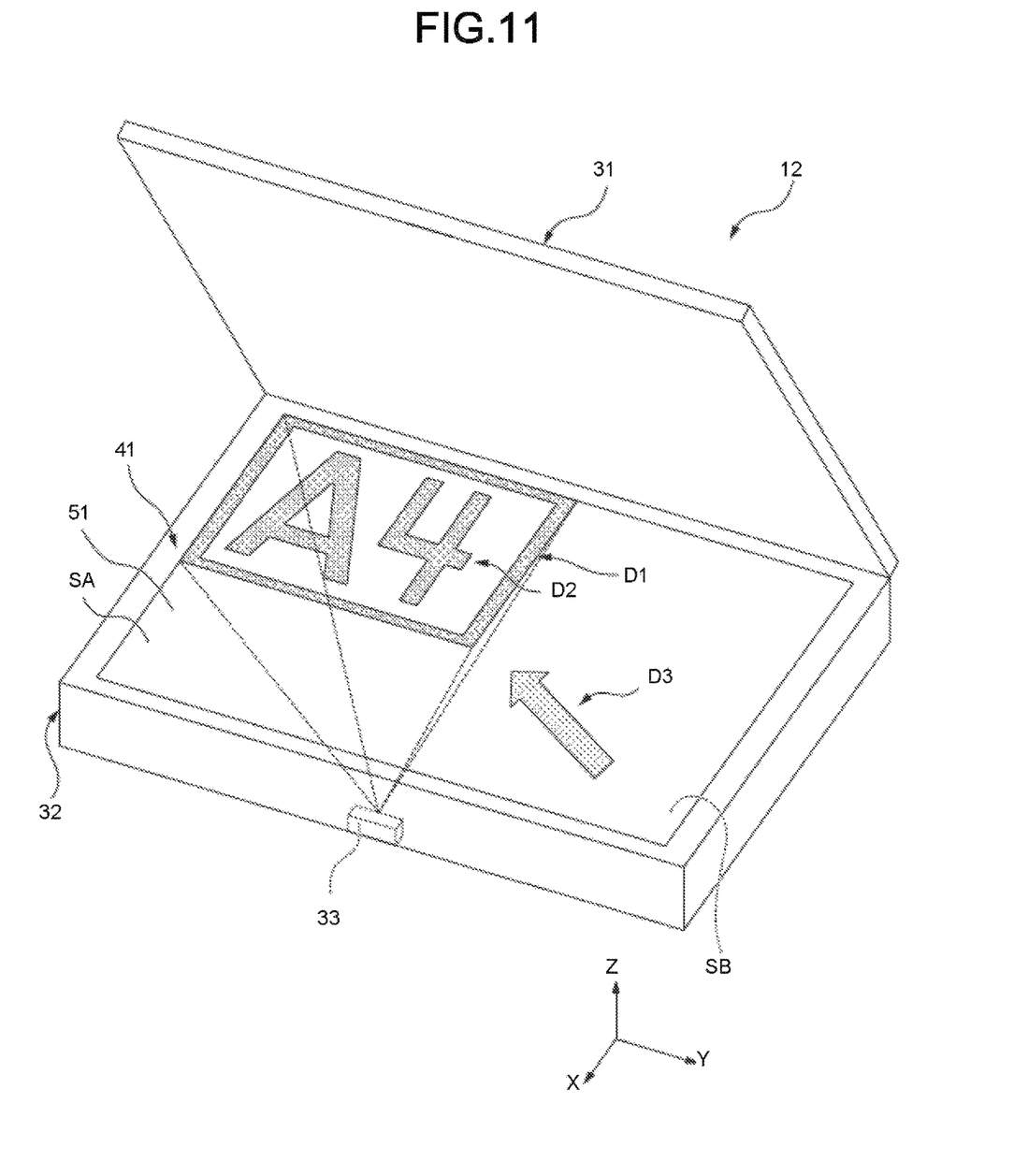
FIG. 11 is a perspective view schematically illustrating a location of the irradiation section in the scanner section and a display example formed on the document table glass of the image reading apparatus according to a modification of the embodiment.
Figure 12:
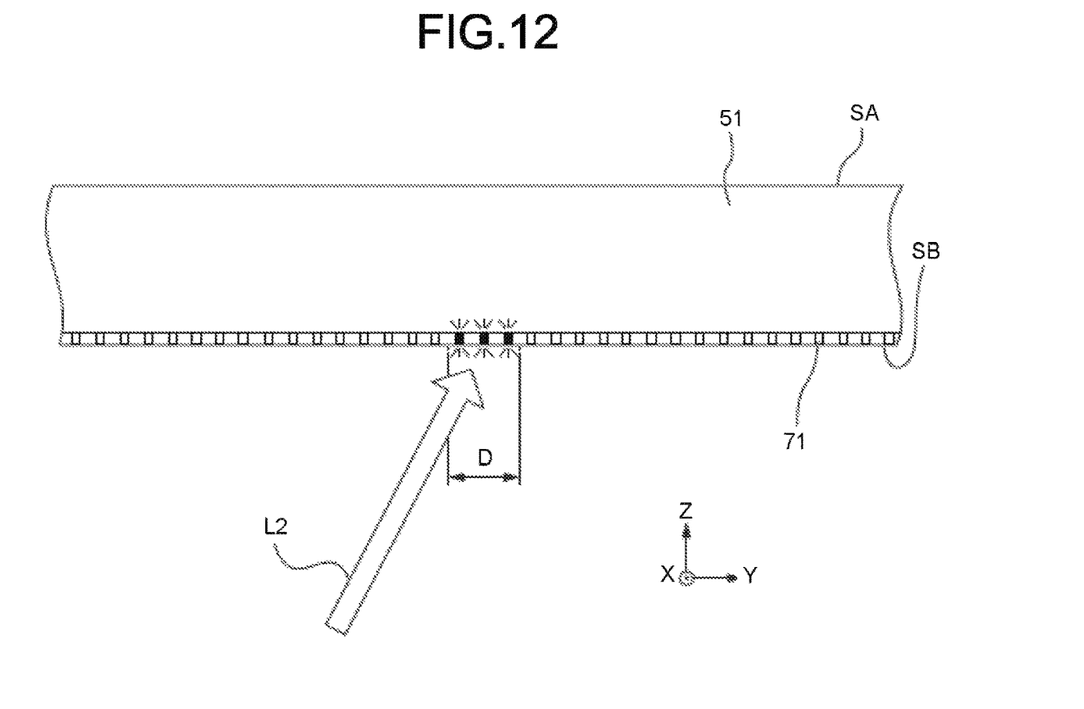
FIG. 12 is a cross-sectional view schematically illustrating an example of a laser light emitted from an irradiation section and a state of the resonant particle in the image reading apparatus according to the modification of the embodiment.

FIG. 11 is a perspective view schematically illustrating an arrangement example of the irradiation section 33 in the scanner section 12 and a display example formed on the document table glass 51 of the image reading apparatus 1 according to the modification of the embodiment. FIG. 12 is a sectional view schematically illustrating an example of the laser light L2 emitted from the irradiation section 33 and the state of the resonant particle 71 of the image reading apparatus 1 according to the modification of the embodiment.

As shown in FIG. 11, in the modification of the embodiment, the irradiation section 33 is arranged in the reading section 32. The irradiation section 33 is disposed at a position where the entire surface of the back surface SB of the document table glass 51 is viewed. For example, the irradiation section 33 is arranged at the end of the main scanning direction X at the bottom of the reading section 32. The irradiation section 33 emits the laser light L2 from the position away from the document table glass 51 towards the document table glass 51 at the back surface SB side in the thickness direction of the document table glass 51. As shown in FIG. 12, the irradiation controller 84 irradiates the resonant particle 71 existing in the scanning area D in the back surface SB of the document table glass 51 with the laser light L2 from the back surface SB side. The image reading apparatus 1 according to the modification of the embodiment has the irradiation section 33 for emitting the laser light L2 from the back surface SB side of the document table glass 51, so that it is possible to prevent the laser light L2 from being obstructed by the user.

Figure 13:
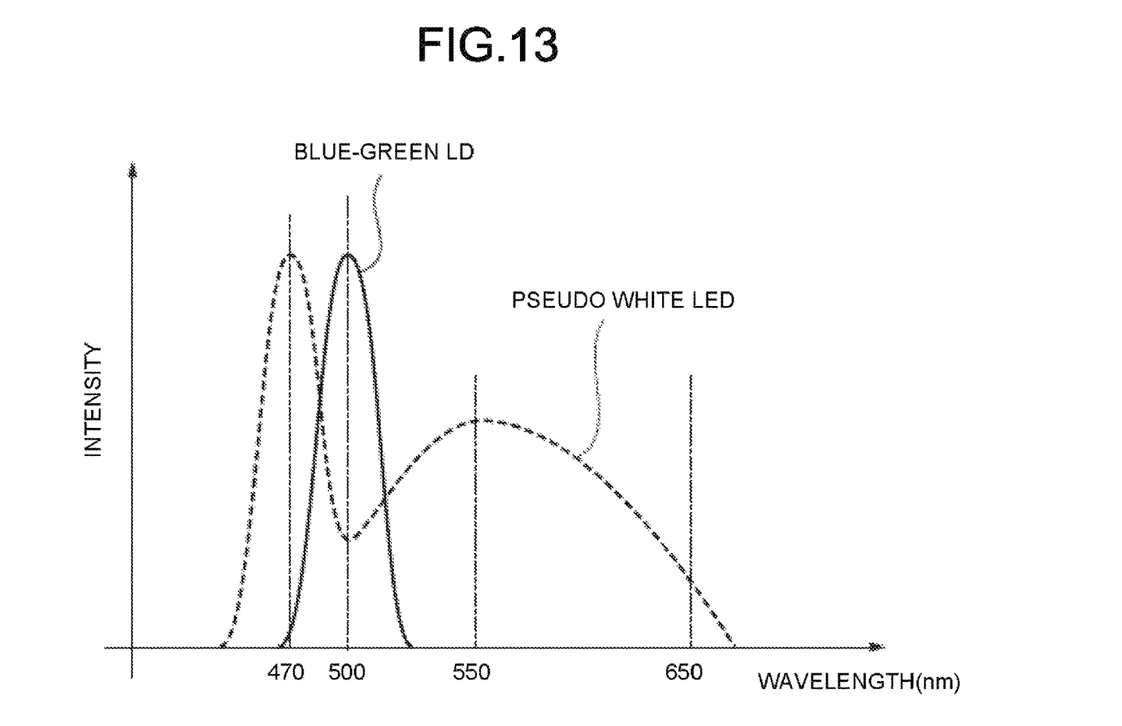
FIG. 13 is a diagram schematically illustrating a spectral distribution of a light source section of the reading section and a spectral distribution of the irradiation section in the image reading apparatus according to the modification of the embodiment.

In the image reading apparatus 1 according to the embodiment described above, the laser light L2 having the predetermined wavelength of the light source 81 is the laser light in the yellow wavelength area, but the invention is not limited thereto. In a modification of the embodiment, the light source section 42a and the light source 81 may be constituted by combination of the red, green and blue LEDs and a yellow LD. FIG. 13 is a diagram schematically illustrating each spectral distribution of the light source section 42a and the irradiation section 33 in the image reading apparatus 1 according to the modification of the embodiment.

As shown in FIG. 13, in the modification of the embodiment, the light source section 42a includes a pseudo white YAG (Yttrium Aluminum Garnet) type LED. The light source 81 includes a blue-green LD. The laser light L2 of the predetermined wavelength is a laser light of a blue-green wavelength area. The blue-green wavelength area is 470 to 530 nm. A plurality of the resonant particles 71 arranged on the back surface SB of the document table glass 51 resonates with the light in the blue-green wavelength area. The wavelength spectrum distribution of the light L1 from the light source section 42a becomes minimum at the blue-green wavelength area according to the pseudo white YAG type LED. The wavelength spectrum distribution of the laser light L2 from the light source 81 becomes maximum at the blue-green wavelength area according to the blue-green LD. The absorbance of the resonant particle 71 of the document table glass 51 becomes maximal at the blue-green wavelength area. The maximum wavelength area in the wavelength spectrum distribution of the laser light L2 from the light source 81 is shifted from the maximum wavelength area in the wavelength spectrum distribution of the light L1 from the light source section 42a. The maximum wavelength area in the wavelength spectrum distribution of the laser light L2 from the light source 81 corresponds to the minimum wavelength area in the wavelength spectrum distribution of the light L1 from the light source section 42a. The resonant particle 71 of the document table glass 51 causes a resonance reaction with respect to the laser light L2 from the light source 81. The resonant particle 71 of the document table glass 51 suppresses the resonance reaction with respect to the light L1 from the light source section 42a.

In the image reading apparatus 1 of the above-mentioned embodiment, the scanner section 12 is provided with the automatic document feeding device 31, but it is not limited thereto. The image reading apparatus 1 according to the modification of the embodiment may be provided with a platen cover instead of the automatic document feeding device 31. The platen cover includes the platen 31a and the opening and closing mechanism. The opening and closing mechanism opens and closes the platen cover with respect to the document table glass 51. The platen cover exposes the surface of the document table glass 51 to the outside in an open state. In the closed state, the platen cover covers the entire surface of the sheet placing surface SA of the document table glass 51 with the platen 31a. The irradiation section 33 is located in the platen cover.

In the image reading apparatus 1 of the embodiment described above, the document table 41 is provided with the document table glass 51, but it is not limited thereto. In the image reading apparatus 1 according to the modification of the embodiment, the document table 41 may include a plate-like member made by the light transparency material other than the glass instead of the document table glass 51. For example, the light transparency material other than the glass is the light transparency resin or ceramic.

According to at least one embodiment described above, by including the display section which performs the display on the plate-like member with the light transparency where the sheet is placed, it is possible to present the accurate information to the user.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image reading apparatus, comprising:
   a plate with light transparency on which a sheet is to be placed, the plate including light-responsive display elements;
   a cover for the plate;
   a sensor configured to detect opening and closing of the cover;
   a scanner including a first light source and a light sensor and configured to read image information of a sheet placed on the plate according to light detected by the light sensor in response to light irradiated by the first light source;
   a second light source that is provided in the cover and activated when the sensor detects opening of the cover, and is controlled to irradiate light on a portion of the light-responsive display elements in the plate to produce a visible image on the plate; and
   an operation section through which a size of the sheet placed on the plate is input,
   wherein the visible image produced is a frame having the size.

2. The image reading apparatus according to claim 1, wherein the cover is a lower platen of an automatic document feeding device.

3. The image reading apparatus according to claim 1, wherein the second light source irradiates the light from a side of the plate that is opposite to the sheet placement side.

4. The image reading apparatus according to claim 1, wherein the first light source irradiates light of red, green, and blue wavelengths, and the second light source irradiates light of yellow wavelength.

5. The image reading apparatus according to claim 1, wherein the first light source is a pseudo-white light emitting diode and the second light source is a blue-green laser diode.

6. The image reading apparatus according to claim 1, wherein
   the plate is a rectangular glass having opposite first and second planar sides, and
   the sheet placement side is an outer side of the first planar side and the light-responsive display elements are installed on an inner side of the second planar side.

7. An image forming apparatus, comprising:
   a plate with light transparency on which a sheet is to be placed, the plate including light-responsive display elements;
   a cover for the plate;
   a sensor configured to detect opening and closing of the cover;
   a scanner including a first light source and a light sensor and configured to read image information of a sheet placed on the plate according to light detected by the light sensor in response to light irradiated by the first light source;

a second light source that is provided in the cover and activated when the sensor detects opening of the cover, and is controlled to irradiate light on a portion of the light-responsive display elements in the plate to produce a visible image on the plate;

a sheet feeding section;

a printer section configured to form an image on a sheet supplied from the sheet feeding section according to the image information read by the scanner; and an operation section through which a size of the sheet placed on the plate is input, wherein the visible image produced is a frame having the sheet size.

8. The image forming apparatus according to claim 7, wherein the cover is a lower platen of an automatic document feeding device.

9. The image forming apparatus according to claim 7, wherein the second light source irradiates the light from a side of the plate that is opposite to the sheet placement side.

10. The image forming apparatus according to claim 7, wherein the first light source irradiates light of red, green, and blue wavelengths, and the second light source irradiates light of yellow wavelength.

11. The image forming apparatus according to claim 7, wherein the first light source is a pseudo-white light emitting diode and the second light source is a blue-green laser diode.

12. The image reading apparatus according to claim 7, wherein
the plate is a rectangular glass having opposite first and second planar sides, and
the sheet placement side is an outer side of the first planar side and the light-responsive display elements are installed on an inner side of the second planar side.

13. A method of displaying a sheet placement area on a document platen of an image reading apparatus, wherein the document platen includes light-responsive display elements, said comprising:

setting a sheet size according to a user input;

detecting an opening of a cover for the document platen with a sensor;

activating a first light source provided in the cover when the sensor detects opening of the cover;

irradiating a portion of the light-responsive display elements with the activated first light source to produce a visible sheet frame having the set sheet size; and scanning a sheet placed on the document platen with a second light source and detecting light reflected from the sheet with a light sensor to read image information of the sheet.

* * * * *